(12) United States Patent
Wu et al.

(10) Patent No.: US 6,684,021 B2
(45) Date of Patent: Jan. 27, 2004

(54) ROTATABLE OPTICAL FIBER CABLE HOLDER

(75) Inventors: Kun-Tsan Wu, Tu-Chen (TW); Tsung Wei Chiang, Tu-Chen (TW)

(73) Assignee: Hon Hai Precision Inc. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/033,260

(22) Filed: Dec. 26, 2001

(65) Prior Publication Data
US 2003/0091316 A1 May 15, 2003

(30) Foreign Application Priority Data
Nov. 15, 2001 (TW) ...................................... 90219625 U

(51) Int. Cl.[7] ................................................ G02B 6/00
(52) U.S. Cl. ........................ 385/137; 385/134; 385/136
(58) Field of Search .................................. 385/134, 136, 385/137; 248/63, 74.1, 74.2, 74.3, 74.4

(56) References Cited

U.S. PATENT DOCUMENTS

| | | | | |
|---|---|---|---|---|
| 4,542,871 A | * | 9/1985 | Fortsch | 248/73 |
| 4,691,883 A | * | 9/1987 | Kurihara | 248/74.2 |
| 5,799,906 A | * | 9/1998 | Hillegonds | 248/49 |

* cited by examiner

Primary Examiner—Toan Ton
Assistant Examiner—Michael H. Caley
(74) Attorney, Agent, or Firm—Wei Te Chung

(57) ABSTRACT

An optical fiber cable holder (1) includes a holding member (2) and a fixing member (3). The holding member includes a top cover (21), a pair of holding arms (22) extending from opposite sides of the top cover, a pair of spring arms (23) extending from other opposite sides of the top cover, and a pair of locking hands (24) extending from the spring arms. A guide slot (211) is defined in the top cover, and a pair of receiving holes (213) is defined in the holding arms for retainingly receiving optical fibers (4) therein. The fixing member includes a base plate (2), an locking ring (32) connected with the base plate, and a locking groove (34) defined between the locking ring and the base plate. The locking hands are slidably received in the locking groove. The holding member is thereby rotatably engaged with the fixing member.

19 Claims, 3 Drawing Sheets

ROTATABLE OPTICAL FIBER CABLE HOLDER

BACKGROUND OF THE INVENTION

1. Field of the Invention

The present invention relates to optical fiber cable holders, and more particularly to an optical fiber cable holder having a rotatable holding member.

2. Description of the Related Art

In optical transmission networks, communication is performed by light transmitting devices connected to one another by optical fiber cables. Optical fiber cable holders retain the cables in position between the light transmitting devices. Each cable generally comprises a core bundle of optical fibers made of frangible quartz glass, and an outer cladding protecting the core. When the position of a light transmitting device in a network is changed, the cables can readily bend. A cable may be required to be bent at a point where it is held by a cable holder. Excessive bending can result in leakage of light from the optical fibers, and even breakage of the optical fibers.

Conventional cable holders are most often used for electrical cables. U.S. Pat. No. 5,149,027 discloses a snap fit cable holder having a U-shaped configuration. Two legs each have snap fit projections on both insides and outsides thereof, the projections being at different heights relative to a support base. Cables are positioned in a space between the legs and the support base. The holder can accommodate varying amounts and varying sizes of cables. However, the holder is fixed and static such that it does not prevent excessive bending of cables in the event of the cables being moved.

U.S. Pat. No. 5,530,785 discloses an optical fiber cable fixing structure. The fixing structure comprises an arcuate inner peripheral surface for contacting a first cable holding member secured to a fixing member, and an arcuate inner peripheral surface for contacting a side surface of an optical fiber cable. A second cable holding member is mounted on the fixing member, for sliding toward and away from the first cable holding member. The second cable holding member has an arcuate second inner peripheral surface for contacting a side surface of the cable, and stopper means adapted to removably fix the second cable holding member in any desired position. However, the fixing structure is static such that it does not prevent excessive bending of cables in the event of the cables being moved.

In view of the above, there is a need for an improved holder which can effectively prevent excessive bending or pulling of optical fiber cables.

SUMMARY OF THE INVENTION

Therefore, an object of the present invention is to provide an optical fiber cable holder which prevents excessive bending of optical fiber cables.

To achieve the above-mentioned object, an optical fiber cable holder includes a holding member and a fixing member. The holding member includes a top cover, a pair of holding arms extending from opposite sides of the top cover, a pair of spring arms extending from other opposite sides of the top cover, and a pair of locking hands extending from the spring arms. A guide slot is defined in the top cover, and a pair of receiving holes is defined in the holding arms for retainingly receiving optical fibers therein. The fixing member includes a base plate, an locking ring connected with the base plate, and a locking groove defined between the locking ring and the base plate. The locking hands are slidably received in the locking groove. The holding member is thereby rotatably engaged with the fixing member.

Other objects, advantages and novel features of the invention will become more apparent from the following detailed description when taken in conjunction with the accompany drawings, in which:

DETAILED DESCRIPTION OF THE INVENTION

Figure 1:
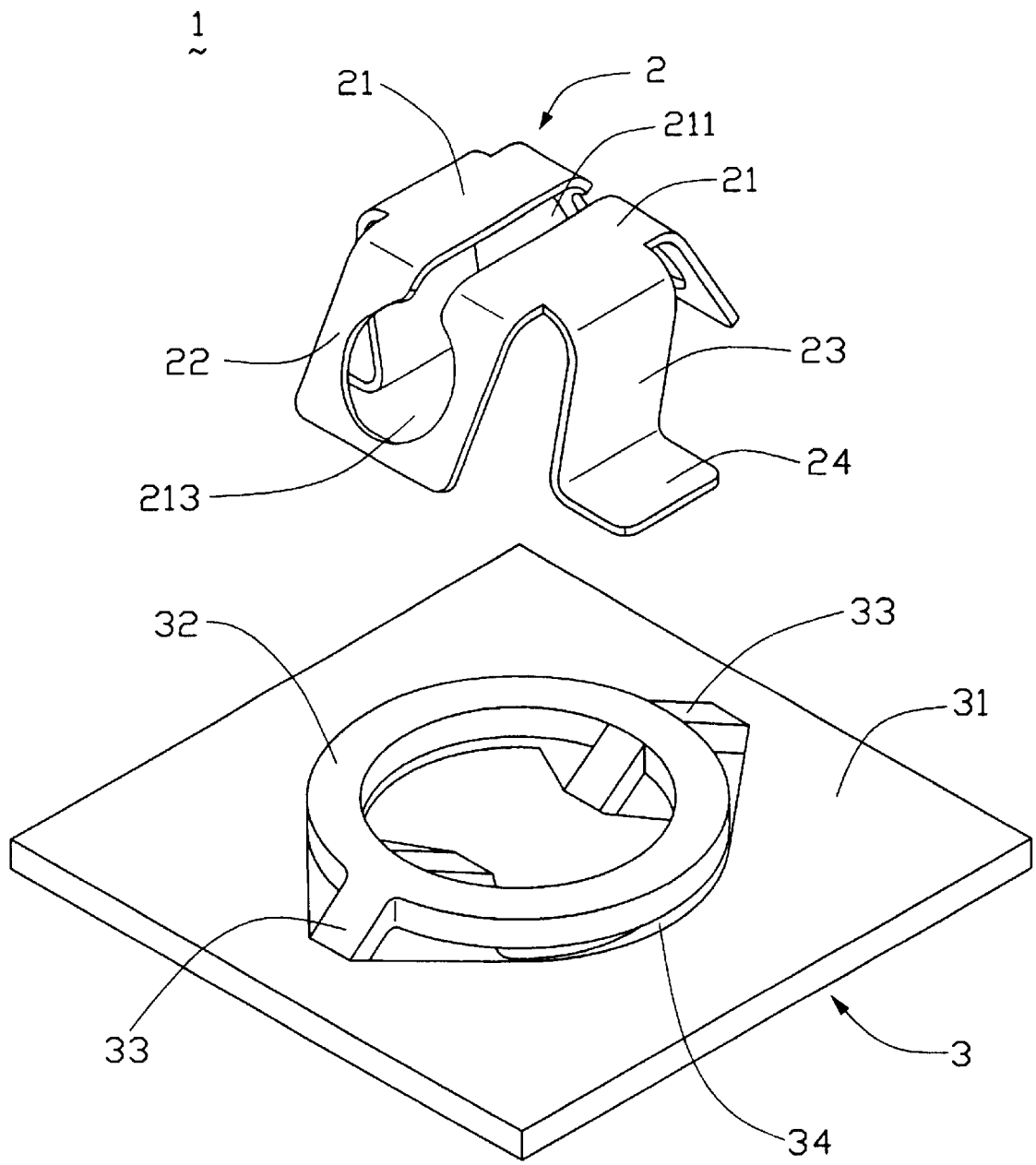
FIG. 1 is an exploded perspective view of an optical fiber cable holder in accordance with the present invention.
Figure 2:
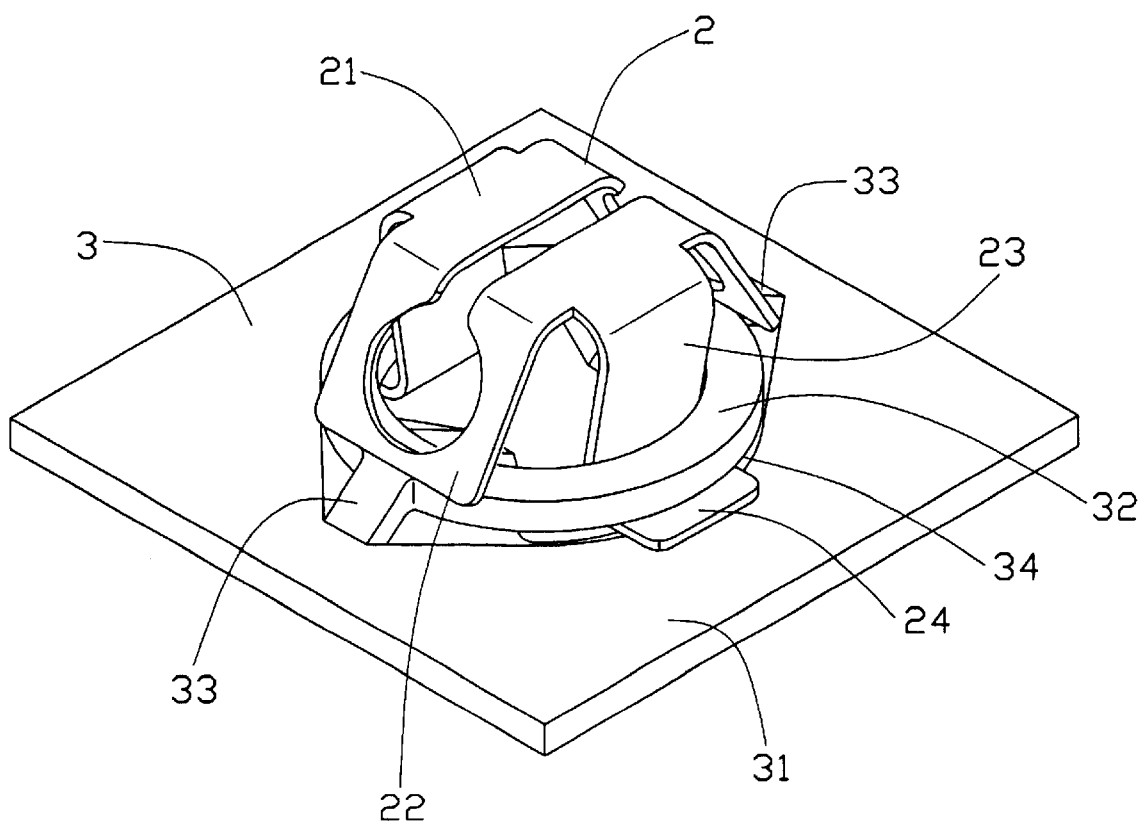
FIG. 2 is an assembled view of FIG. 1.
Figure 3:
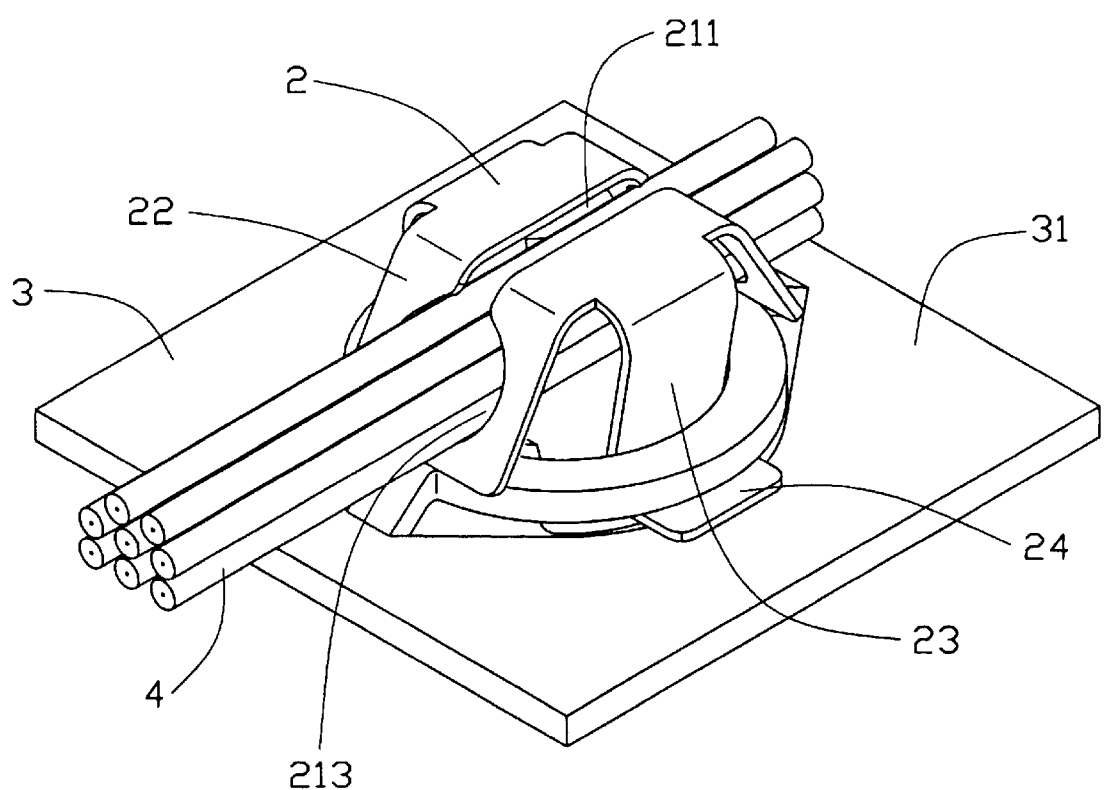
FIG. 3 is similar to FIG. 2, but showing optical fiber cables retained in the optical fiber cable holder.

Referring to FIGS. 1–3, an optical fiber cable holder in accordance with a preferred embodiment of the present invention comprises a holding member 2 for holding optical fibers 4, and a fixing member 3. The holding member 2 is integrally made from a single piece of stamped metal or as a single piece of injection molded plastic material. The fixing member 3 may form a part of light transmitting device, or may be separately formed for mounting on a light transmitting device. If the fixing member 3 is separately formed, it is integrally made from a single piece of stamped metal or as a single piece of injection molded plastic material. The holding member 2 is fixed on the fixing member 3.

The holding member 2 comprises a top cover 21, a pair of holding arms 22 respectively slanting downwardly and outwardly from opposite sides of the top cover 21, a pair of elastically deformable spring arms 23 respectively extending downwardly and slightly inwardly from other opposite sides of the top cover 21, and a pair of locking hands 24 respectively extending perpendicularly outwardly from bottom edges of the spring arms 23. A guide slot 211 is defined through a middle of the top cover 21 and adjoining portions of the holding arms 22. A pair of circular receiving holes 213 is respectively defined in the holding arms 22, in communication with the guide slot 211. The receiving holes 213 retainingly receive the fibers 4.

The fixing member 3 comprises a square base plate 31, and an locking ring 32 connected with the base plate 31 by two pairs of support legs 33 that are upwardly formed from the base plate 31 at opposite sides of the locking ring 32 respectively. An annular locking groove 34 is thereby defined between the base plate 31 and the locking ring 32. A height of the locking groove 34 is greater than a corresponding thickness of each locking hands 24 of the holding member 2. Therefore the locking hands 24 are slidably receivable in the locking groove 34, to enable the holding member 2 to be rotatably engaged with the fixing member 3.

Referring to FIGS. 1 and 2, in assembly, the spring arms 23 of the holding member 2 are squeezed toward each other. The locking hands 24 of holding member 2 are passed through the locking ring 32 of the fixing member 3. The spring arms 23 are released, and resiliently return back to their original orientations. The locking hands 24 are slidably received in the clasping groove 34 of the fixing member 3. The locking hands 24 are retained in the locking groove 34 between the base plate 31 and the locking ring 32 of the fixing member 3. Thus, the holding member 2 is securely but rotatably engaged with the fixing member 3.

In removing the holding member 2 from the fixing member 3, the holding arms 22 are squeezed toward each other. The locking hands 24 are thus withdrawn from the locking groove 34 of the fixing member 3. The holding arms 22 are then passed back out through the locking ring 32 of the fixing member 3.

Referring to FIG. 3, in use, the fibers 4 are sequentially passed through the guide slot 211 and retained in the receiving holes 23 of the holding member 2. Because the holding member 2 is rotatable, the retained fibers 4 can be turned in various directions according to changes made in a position of an associated light transmitting device in a communications network. This prevents excessive bending or pulling of the fibers 4.

It should be understood that various changes and modifications to the presently preferred embodiment described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. An optical fiber cable holder comprising:
    a holding member defining a space for receiving a plurality of optical fibers; and
    a fixing member for rotatably engaging with the holding member; wherein
        the holding member comprises a top cover, a pair of spring arms extending downwardly from two opposite sides of the top cover, and a locking member extending outwardly from the spring arms to be locked within the fixing member.

2. The optical fiber cable holder as described in claim 1, wherein the fixing member defines a looking groove, and the locking member is rotatably received in the locking groove.

3. The optical fiber cable holder as described in claim 2, wherein the fixing member further comprises a base plate and a locking ring formed on the base plate.

4. The optical fiber cable holder as described in claim 3, wherein at least one support leg extends from the base plate and connects with the locking ring.

5. The optical fiber cable holder as described in claim 3, wherein the locking groove is defined between the locking ring and the base plate.

6. The optical fiber cable holder as described in claim 1, wherein a guide slot is defined in the top cover.

7. The optical fiber cable holder as described in claim 6, further comprising a pair of holding arms extending from opposite sides of the top cover other than the sides from which the spring arms depend.

8. The optical fiber cable holder as described in claim 7, wherein a pair of receiving holes is defined through the holding arms and is in communication with the guide slot.

9. The optical fiber cable holder as described in claim 8, wherein the optical fiber cables are sequentially received through the guide slot to be retainingly received in the receiving holes.

10. The optical fiber cable holder as described in claim 1, wherein the holding member and the fixing member are each stamped from a single piece of metallic material.

11. The optical fiber cable holder as described in claim 1, wherein the holding member and the fixing member are each formed as a single piece of injection molded plastic material.

12. An optical fiber cable holder comprising:
    a holding member to hold optical fiber cables, the holding member comprising a top cover, a pair of holding arms, and a pair of spring arms, wherein
        a guide slot is defined in the top cover, a pair of receiving holes is defined in the holding arms in communication with the guide slot for retainingly receiving the optical fiber cables therein, and a pair of locking members extends from the spring arms; and
    a fixing member for fixing the holding member therein, the fixing member comprising a base plate and a locking ring, wherein the locking ring connects with the base plate, and a locking groove is defined between the locking ring and the base plate slidably receiving the locking members of the holding member.

13. The optical fiber cable holder as described in claim 12, wherein the spring arms extend from the opposite sides of the top cover, and are elastically deformable.

14. The optical fiber cable holder as described in claim 12, wherein at least one support leg extends from the base plate and connects with the locking ring.

15. The optical fiber cable holder as described in claim 12, wherein the optical fiber cables are sequential received through the guide slot to be retainingly received in the receiving holes.

16. The optical fiber cable holder as described in claim 12, wherein the height of the locking groove of the fixing member is greater than the thickness of the locking member of the holding member.

17. The optical fiber cable holder as described in claim 12, wherein the holding member and the fixing member are each stamped from a single piece of metallic material.

18. The optical fiber cable holder as described in claim 12, wherein the holding member and the fixing member are each formed as a single piece of injection molded plastic material.

19. An optical fiber holder comprising:
    a base defining a locking ring upwardly spaced from an upper face of the base with a locking groove formed between the locking ring and the upper face; and
    a holding member defining a pair of opposite locking hands lactchably while rotatably engaged within the locking groove, and a pair of holding arms, said pair of holding arms defining respectively a pair of holding holes retainably receiving a plurality of optical fibers therein; wherein
        a top cover connecting said pair of holding arms and a guide slot in communication with said pair of holding holes for allowing the optical fibers to be inserted therethrough toward said holding holes; wherein the locking hands are seated upon the upper face of the base.

* * * * *